UNITED STATES PATENT OFFICE.

ANDREW HILPERT, OF PHILADELPHIA, PENNSYLVANIA.

IMPROVEMENT IN COMPOSITION FOR DESTROYING INSECTS.

Specification forming part of Letters Patent No. 174,629, dated March 14, 1876; application filed February 2, 1876.

*To all whom it may concern:*

Be it known that I, ANDREW HILPERT, of the city and county of Philadelphia and State of Pennsylvania, have invented a new and useful Compound for Destroying Bed-Bugs and other Vermin, which is fully described in the following specification.

In carrying out my invention, I take: Mercury, one ounce; nitric acid, two ounces, and combine them, and, after the same has foamed ten minutes, I add best furniture varnish, nine ounces, which arrests the foaming and thickens the mass, after it has rested, say, twelve to eighteen hours. I then add a quantity of turpentine, for assisting the action of the compound, and to thin the same, so that it may be run into bottles and properly flow during use. As a final step, I drop a small piece of corrosive sublimate in each bottle of the composition as made, and the preparation is ready for use.

The article may be applied with a feather or brush to the joints of furniture, seams of mattresses, holes of mice, rats, &c., and other vermin-infested places, and it will dry and present the appearance of varnish, its fetid smell and horrible taste driving the vermin from, and preventing them coming to, the spot where the compound is applied.

Having thus described my invention, what I claim as new, and desire to secure by Letters Patent, is—

The composition of matter consisting of mercury, nitric acid, varnish, turpentine, and corrosive sublimate, substantially as and for the purpose set forth.

ANDR. HILPERT.

Witnesses:
    JOHN A. WIEDERSHEIM,
    LOUISE ERHART.